United States Patent [19]

Obenshain

[11] 4,329,212
[45] May 11, 1982

[54] METHOD FOR MAKING OZONE
[75] Inventor: David N. Obenshain, Swanton, Md.
[73] Assignee: Westvaco Corporation, New York, N.Y.
[21] Appl. No.: 200,782
[22] Filed: Oct. 27, 1980
[51] Int. Cl.³ .............................................. B01J 19/12
[52] U.S. Cl. ........................................... 204/157.1 R
[58] Field of Search ................. 204/157.1 R, 157.1 L, 204/176

[56]  References Cited
U.S. PATENT DOCUMENTS

| | | | |
|---|---|---|---|
| 4,086,152 | 4/1978 | Rich et al. ............................. | 204/176 |
| 4,124,467 | 11/1978 | Pincon ................................. | 204/157.1 |
| 4,131,528 | 12/1978 | Tsujimoto et al. .......... | 204/157.1 R |
| 4,182,663 | 1/1980 | Vaseen ................................. | 204/157.1 |
| 4,214,962 | 7/1980 | Pincon ................................. | 204/157.1 |

Primary Examiner—Howard S. Williams

[57] ABSTRACT

An apparatus and method is disclosed for manufacturing ozone by treating oxygen or an oxygen bearing gas with UV radiation in the range of from about 130–170 nm. The method involves the use of cathode rays to bombard a UV emitting material which emits radiation substantially in the 130–170 nm range. The invention takes advantage of the fact that no radiation is generated substantially above 200 nm or below 130 nm which wavelengths tend to destroy ozone. Thus, unlike the prior art, the present invention does not both make and destroy ozone, but simply makes ozone.

2 Claims, 7 Drawing Figures

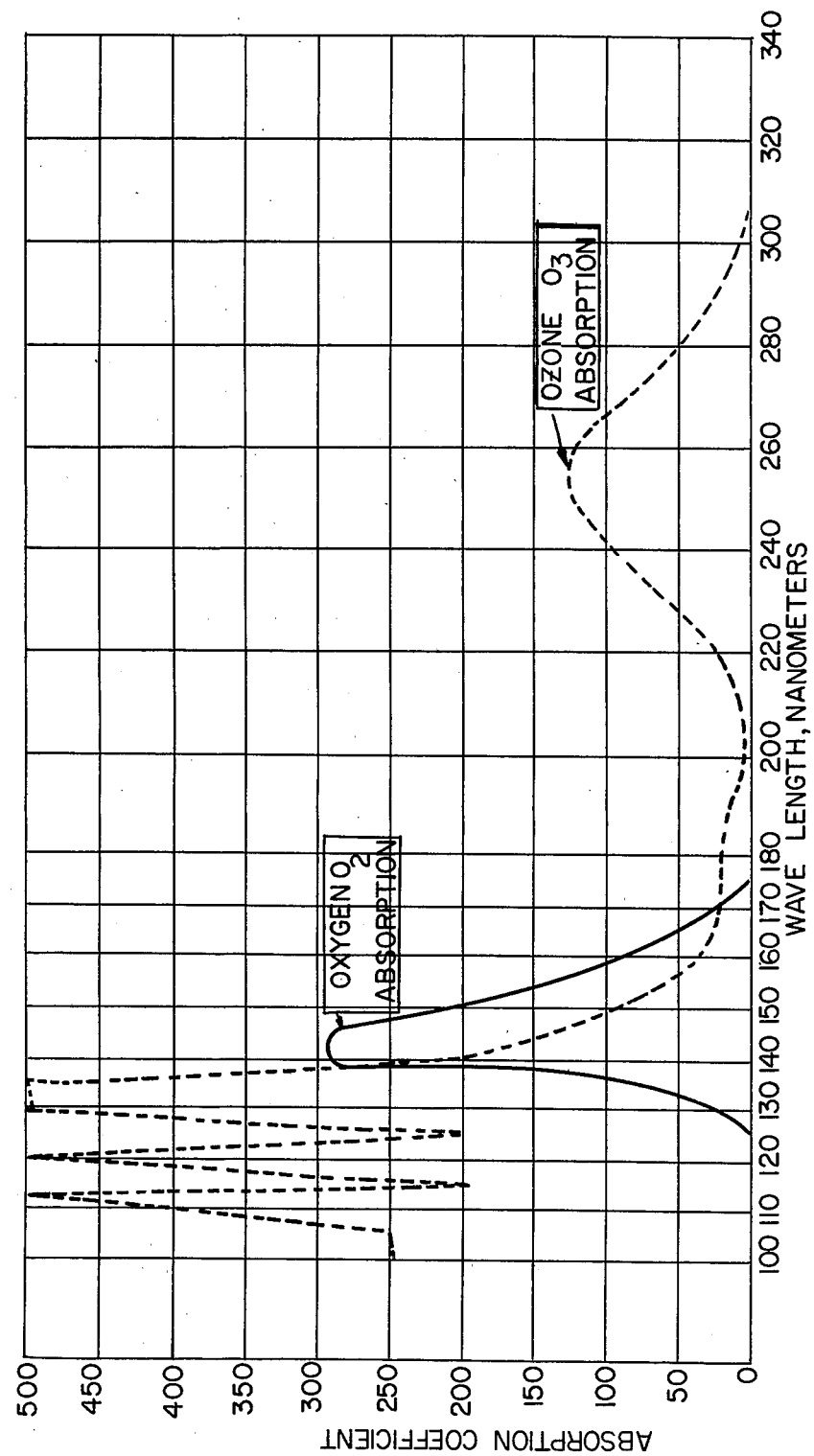

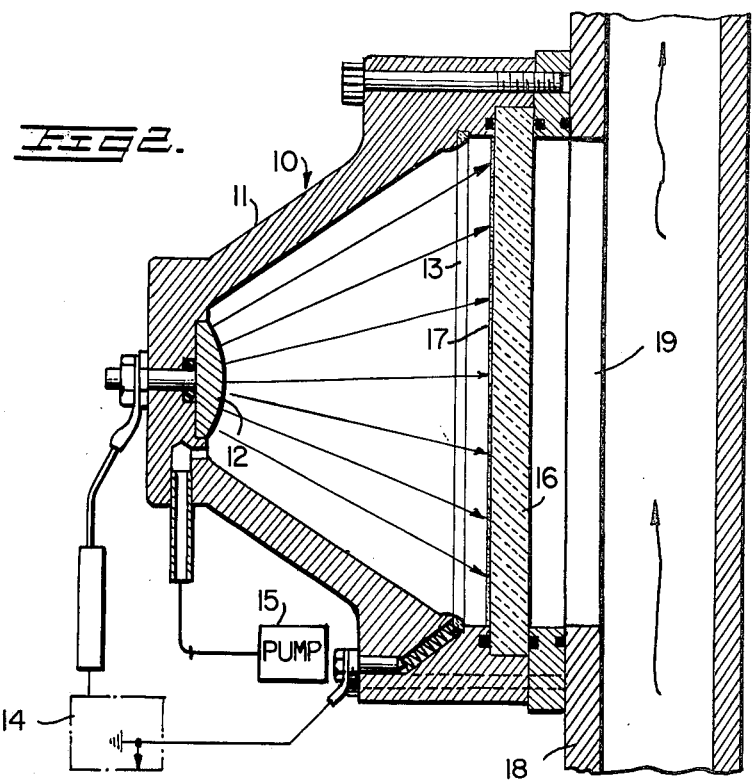
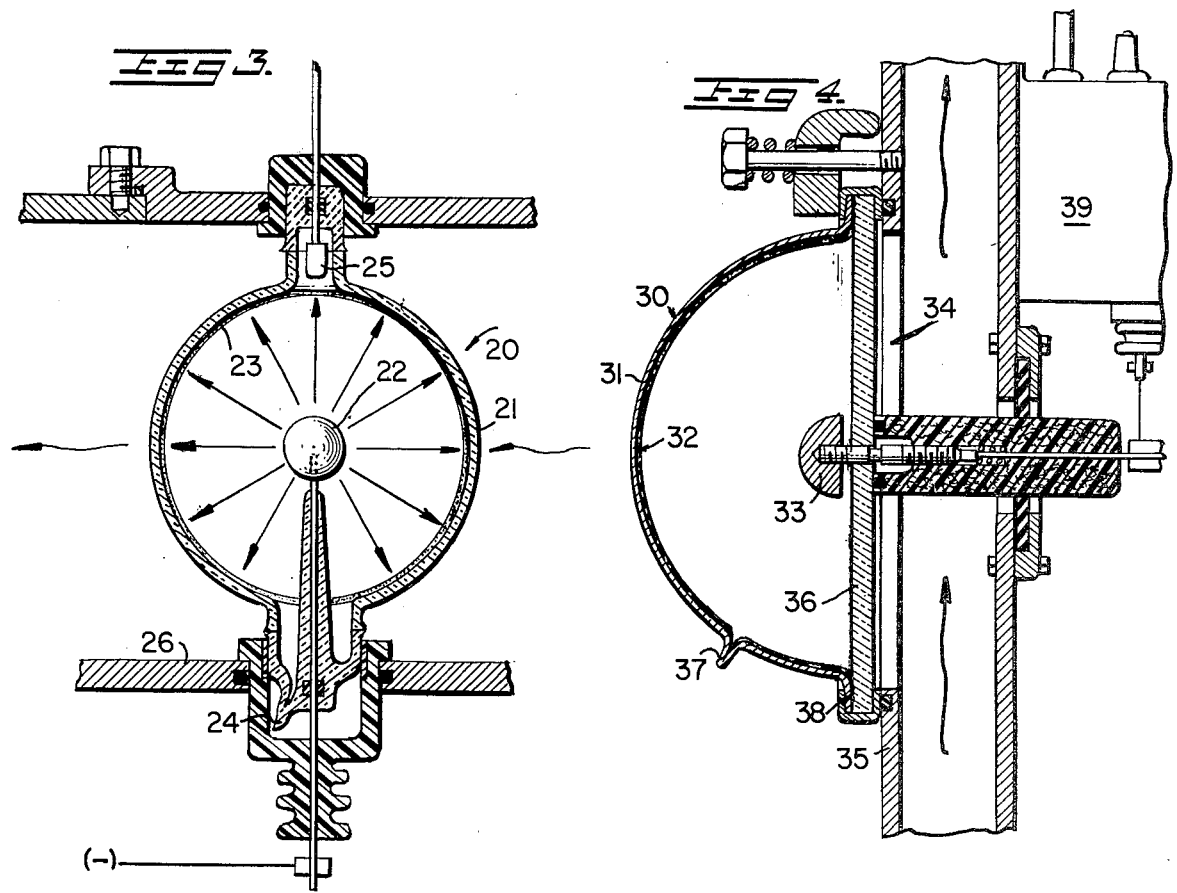

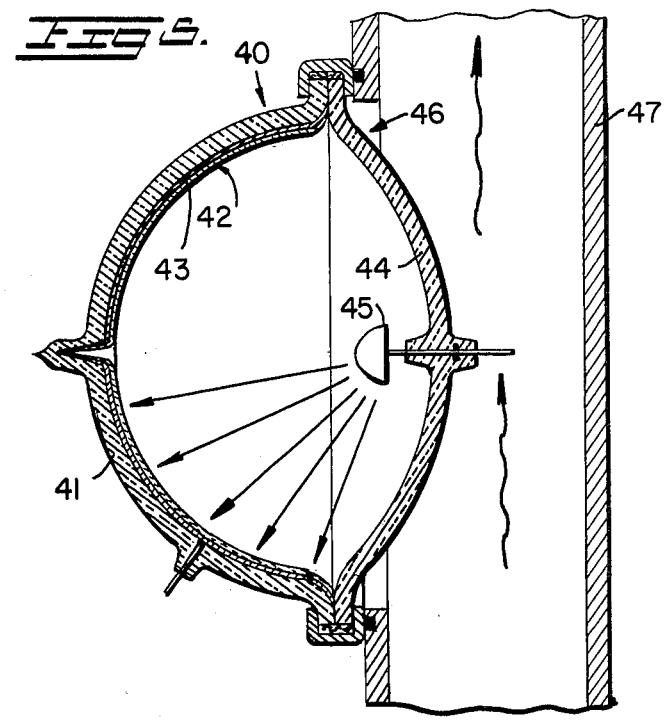
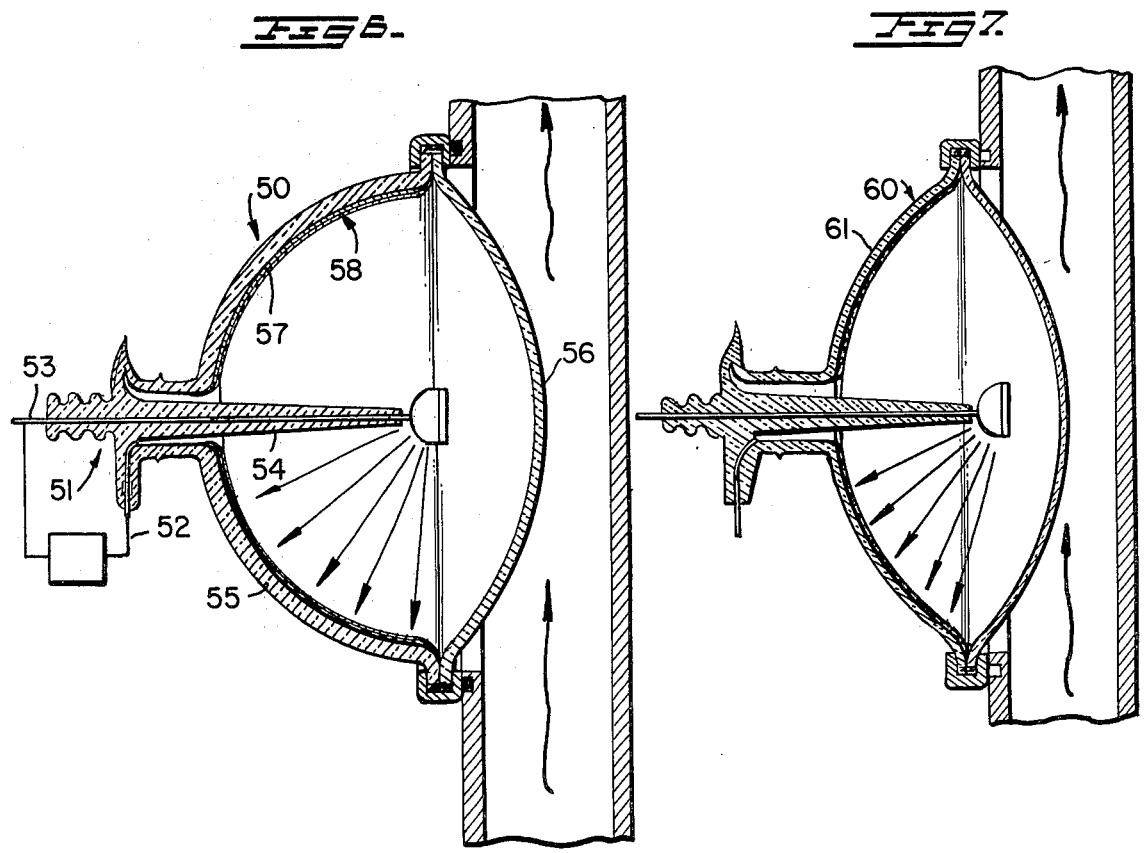

METHOD FOR MAKING OZONE

BACKGROUND OF THE INVENTION

The present invention relates generally to an improved apparatus and method for the generation of singlet oxygen atoms which may combine with oxygen molecules to produce ozone.

In general, there are two basic methods for producing ozone. One such method involves gaseous discharge type devices wherein a gas filled tube is used to produce radiation of a suitable wavelength to generate ozone. Another method involves the use of electrical energy from corona discharge, x-rays, cathode rays and the like to produce radiation that generates ozone. In either case, the principle behind the production of ozone involves the adsorption by oxygen of ultraviolet radiation to form singlet oxygen atoms which combine with other oxygen molecules to produce ozone.

The prior art includes many patents and other literature which describe variations of the two ozone generation methods outlined above, and which describe different types of apparatus useful for producing ozone and for utilizing the ozone so produced. Unfortunately most of the ozone generators of the prior art are inefficient or unworkable for various reasons. Chief among these reasons is the failure of the prior art practitioners to recognize that ozone is only produced over a very narrow range of the entire electromagnetic spectrum, and in fact is destroyed by a wide range of radiation in the electromagnetic spectrum. Thus, in much of the prior art, the methods described actually suggest using radiation which includes wavelengths that destroy ozone. However, in accordance with the present invention, a method and apparatus for generating ozone is described wherein only radiation of the desired wavelength is generated and transmitted for maximum efficiency.

SUMMARY OF THE INVENTION

The present invention is based on the discovery that ozone may be generated by exposing air or oxygen to ultraviolet radiation of wavelengths to cause the oxygen molecule to split into two oxygen atoms, which being very reactive, immediately combine with other oxygen molecules to form ozone. Conversely, the invention is based on the discovery that exposure of ozone to certain other wavelengths in the electromagnetic spectrum causes it to decompose and revert back to oxygen.

The reliability of absorption data below 200 nm (nanometers) is not absolute, because in this region, ultraviolet light is not only absorbed by oxygen and ozone, but it converts oxygen to ozone and also converts ozone back to oxygen. However, about 200 nm, it is quite clear that very little if any oxygen must be converted to ozone. In fact, above 200 nm, ozone has a very strong absorption band peaking at 254 nm. Meanwhile, in the region below 200 nm, both oxygen and ozone have strong areas of ultraviolet radiation absorption. Oxygen appears to have a maximum absorption from about 130 to 170 nm while ozone has strong absorption bands from 110 to 140 nm. In the overlap area between about 140 to 180 nm, ultraviolet radiation both makes and decomposes ozone simultaneously. However, in actual practice, some equilibrium concentration of oxygen and ozone would be reached in this region. Meanwhile, based on this analysis, it appears that a narrow band of radiation from about 130 to 170 nm, with none above 200 nm and none below 130 nm, would be optimum for ozone generation. Accordingly, with this knowledge in mind, the present invention was developed.

According to the present invention, the method of ozone generation is of the type using electrical energy to produce electrons which in turn bombard a substance which emits the desired UV radiation. The preferred source of electrical energy for the present invention is cathode rays although other sources of electrical energy could be substituted if desired. Cathode ray tubes (CRT's) are preferred because of their relatively high power-to-light efficiency, on the order of about 30%. Meanwhile, in order to generate radiation only in the 130 to 170 nm wavelength, the UV emitting substance may comprise a specially blended coating or the like designed to emit only in the desired region. It is known that UV emitting phosphors may be formulated to cover rather narrow emission bands, unlike gases which generally emit radiation over a rather wide range. Finally, the CRT's are provided with windows that will transmit the UV radiation. Such windows may comprise those made from quartz, fluorite and other glasslike materials known to transmit radiation in the desired range.

In operation, one or more of the CRT's are arranged with their transmitting windows opposite a duct through which oxygen or air is passed. As the oxygen or air moves past the windows, the CRT's are energized to produce cathode rays which bombard the UV emitting coatings. When excited by the cathode rays, these coatings emit UV radiation. This radiation in the desired 130-170 nm range is in turn transmitted through the transmitting windows where oxygen molecules passing by may be split into singlet oxygen atoms which combine with other oxygen molecules to produce ozone.

DESCRIPTION OF DRAWING

The single FIGURE of drawing is a graph showing absorption curves for oxygen and ozone.

DETAILED DESCRIPTION

The single FIGURE of drawing illustrates graphically absorption curves for oxygen and ozone over the electromagnetic spectrum. These curves are based on data found in the text *Vacuum Ultraviolet Spectroscopy*, by Zaidel & Shrieder, pages 280, 291. Ozone has strong absorption bands from about 110 to 140 nm while oxygen seems to have maximum absorption from about 130 to 170 nm. Oxygen and ozone overlap to some extent from about 140 to 180 nm, but ozone has a very strong absorption band peaking at 254 nm. Thus, judging from the absorption curves, it appears that a narrow band of radiation from 130 to 170 nm with none above 200 nm and none below 130 nm would be optimum for ozone generation.

An ozone generating cell useful for the present invention may take the form of a typical cathode ray tube (CRT). The CRT includes an acrylic or other nonconducting housing inside which is located a cathode element and an anode. It is a well known fact that cathode rays (negative electrons) are emitted normal to the surface of the cathode at their points of emission. A concave cathode can thus focus the rays to a point, and a convex cathode can spread the cathode rays to cover a large area. The CRT is connected to a high voltage source and is evacuated with a vacuum pump or the like.

Opposite the cathode element, the CRT is provided with a window element that is manufactured from a material that will transmit radiation at the desired lower end of the UV spectrum. The window may be constructed from any material that transmits in the desired range of which flourite is one example. Other examples of window materials that may be useful for the present invention include combinations of quartz and fluorite and UV emitting windows prepared from thiourea-formaldehyde resins. The inside of the window is coated with a material that is designed to emit radiation only in the desired 130-170 nm range when bombarded with cathode rays discharged from a cathode. A preferred material for this purpose is a specially designed phosphor coating prepared from a zinc oxide magnesium oxide matrix with a small amount of an activator, usually a rare earth element. U.S. Pat. No. 2,683,693 describes a process for preparing UV emitting coatings substantially as required for the present invention. However, other phosphor materials may be used, particularly as disclosed in U.S. Pat. No. 2,779,949, providing the materials are made to limit their emissions to the desired 130-170 nm wavelengths.

The CRT housing is mounted adjacent an opening in a duct through which air or oxygen is passed for making ozone. In a preferred embodiment, the duct would be provided with a plurality of CRT ozone generators (not shown) each arranged with their windows adjacent to openings wherein the UV radiation emitted from the phosphor coating would be transmitted directly to the passing gas. In this manner the efficiency of such a generating device would be enhanced.

The foregoing description of the invention has been directed to a basic CRT ozone generating method. It will be apparent, however, that those skilled in the art may make modifications and changes in the method without departing from the scope and spirit of the invention.

Accordingly, the following claims are intended to cover all such modifications and variations that fall within the true spirit and scope of the invention.

I claim:

1. A method of producing ozone from oxygen or an oxygen bearing gas comprising, exposing a UV emitting phosphor compound which emits radiation only in the range of from about 130 to 170 nanometers to electrical energy, generating ultraviolet radiation in the wave length range of from about 130 to 170 nanometers, with substantially none below 130 nm or above 200 nm, and exposing the oxygen or oxygen bearing gas to the ultraviolet radiation whereby a portion of the oxygen molecules are converted to single oxygen atoms which combine with other oxygen molecules to produce ozone.

2. The method of claim 1 wherein the electrical energy is in the form of cathode rays produced by cathode ray generating devices.

* * * * *